US010401572B2

(12) United States Patent
Isenhour et al.

(10) Patent No.: US 10,401,572 B2
(45) Date of Patent: *Sep. 3, 2019

(54) FIBER OPTIC CONNECTORS INCLUDING FERRULES WITH COMPLEMENTARY MATING GEOMETRY AND RELATED FIBER OPTIC CONNECTORS

(71) Applicant: Corning Optical Communications LLC, Hickory, NC (US)

(72) Inventors: Micah Colen Isenhour, Lincolnton, NC (US); Dennis Michael Knecht, Hickory, NC (US); James Phillip Luther, Hickory, NC (US); Thomas Theuerkorn, Hickory, NC (US)

(73) Assignee: Corning Optical Communications, LLC, Hickory, NC (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/751,280

(22) Filed: Jan. 28, 2013

(65) Prior Publication Data

US 2013/0136398 A1    May 30, 2013

Related U.S. Application Data

(63) Continuation of application No. PCT/US2011/045176, filed on Jul. 25, 2011.
(Continued)

(51) Int. Cl.
*G02B 6/36* (2006.01)
*G02B 6/38* (2006.01)

(52) U.S. Cl.
CPC ............. *G02B 6/36* (2013.01); *G02B 6/3831* (2013.01); *G02B 6/3882* (2013.01);
(Continued)

(58) Field of Classification Search
CPC ... G02B 6/00; G02B 6/36; G02B 6/38; G02B 6/40; G02B 6/42; G02B 6/3817;
(Continued)

(56) References Cited

U.S. PATENT DOCUMENTS 4,830,456 A   5/1989 Kakii et al.
5,214,730 A   5/1993 Nagasawa et al.
(Continued)

FOREIGN PATENT DOCUMENTS

AU    199898138    7/2001
CN    1305250 A    7/2001
(Continued)

OTHER PUBLICATIONS

Patent Cooperation Treaty, International Search Report, Sep. 21, 2011, 5 pages.
(Continued)

*Primary Examiner* — Akm E Ullah
(74) *Attorney, Agent, or Firm* — Michael E. Carroll, Jr.

(57) ABSTRACT

Optical fiber ferrules with complementary mating geometry that are suitable for making optical connections are disclosed along with fiber optic connectors and cable assemblies using the same. In one embodiment, the fiber optic ferrule includes a body having a plurality of optical pathways and a mating geometry that has at least one guide pin that is monolithically formed in the body of the fiber optic ferrule and at least one spring retention feature disposed on a rear portion of the ferrule. The ferrule reduces the number of parts required for a fiber optic connector and allows quick and easy assembly. The disclosure is also directed to fiber optic connectors and cable assemblies using the ferrule.

13 Claims, 6 Drawing Sheets

Related U.S. Application Data

(60) Provisional application No. 61/369,385, filed on Jul. 30, 2010.

(52) U.S. Cl.
CPC .......... *G02B 6/3817* (2013.01); *G02B 6/3821* (2013.01); *G02B 6/3853* (2013.01); *G02B 6/3885* (2013.01); *Y10T 29/49* (2015.01)

(58) Field of Classification Search
CPC .. G02B 6/3821; G02B 6/3831; G02B 6/3882; G02B 6/3885; G02B 6/3853; Y10T 29/49
USPC .............................. 385/71, 88, 147; 29/592
See application file for complete search history.

(56) References Cited

U.S. PATENT DOCUMENTS

| | | | |
|---|---|---|---|
| 5,712,939 A | 1/1998 | Shahid | |
| 5,778,121 A * | 7/1998 | Hyzin | G02B 6/3885 385/55 |
| 5,778,123 A * | 7/1998 | Hagan | G02B 6/3885 385/76 |
| 6,340,247 B1 * | 1/2002 | Sakurai | G02B 6/3885 385/60 |
| 6,454,464 B1 * | 9/2002 | Nolan | G02B 6/3807 385/60 |
| 6,719,927 B2 * | 4/2004 | Sakurai | G02B 6/3885 249/176 |
| 6,736,546 B2 | 5/2004 | Kiani et al. | 385/59 |
| 6,805,493 B2 | 10/2004 | Igl et al. | |
| 7,572,071 B1 | 8/2009 | Wu | |
| 7,798,726 B2 * | 9/2010 | Sabo | 385/88 |
| 8,109,679 B2 | 2/2012 | Danley et al. | |
| 8,523,459 B2 | 9/2013 | Danley et al. | |
| 8,585,300 B2 | 11/2013 | Buijs et al. | |
| 8,613,561 B2 * | 12/2013 | Ko et al. | 385/93 |
| 8,702,325 B2 * | 4/2014 | Wu | 385/93 |
| 8,708,579 B2 * | 4/2014 | Shiratori et al. | 385/93 |
| 9,529,159 B2 * | 12/2016 | Isenhour | G02B 6/36 |
| 2001/0007603 A1 * | 7/2001 | Sakurai | G02B 6/3865 385/60 |
| 2002/0110333 A1 | 8/2002 | Yang | |
| 2002/0114589 A1 * | 8/2002 | Igl | G02B 6/3803 385/88 |
| 2002/0181881 A1 | 12/2002 | Kunkel et al. | 385/52 |
| 2004/0065548 A1 * | 4/2004 | Kaku | C25D 1/02 205/75 |
| 2004/0264874 A1 | 12/2004 | Grabbe | |
| 2005/0036742 A1 * | 2/2005 | Dean, Jr. | G02B 6/3885 385/71 |
| 2010/0046891 A1 * | 2/2010 | Sabo | G02B 6/3817 385/74 |
| 2010/0129031 A1 | 5/2010 | Danley et al. | |
| 2010/0158448 A1 | 6/2010 | Yi et al. | |
| 2010/0226610 A1 | 9/2010 | Kobayashi et al. | 385/58 |
| 2011/0085762 A1 | 4/2011 | Liu et al. | 385/55 |
| 2011/0229083 A1 | 9/2011 | Dainese et al. | |
| 2012/0027364 A1 * | 2/2012 | Tamura | G02B 6/4201 385/92 |
| 2013/0136398 A1 | 5/2013 | Isenhour et al. | |
| 2013/0266268 A1 | 10/2013 | Li et al. | |

FOREIGN PATENT DOCUMENTS

| | | | | |
|---|---|---|---|---|
| CN | 2557968 Y | 6/2003 | | |
| CN | 1643422 A | 7/2005 | | |
| CN | 1786756 A | 6/2006 | | |
| CN | 101529295 A | 9/2009 | | |
| CN | 201417320 Y | 3/2010 | | |
| EP | 1020745 A2 | 7/2000 | | |
| EP | 1107368 A2 | 6/2001 | ............ | H01R 12/16 |
| GB | 2062891 | 5/1981 | | |
| JP | 62-23010 A | 1/1987 | | |
| JP | 1987023010 | 1/1987 | | |
| JP | S62-23010 | 1/1987 | | |
| JP | 1988293510 | 11/1988 | | |
| JP | 1991198009 | 8/1991 | | |
| JP | H03-198009 A | 8/1991 | | |
| JP | 1992006768 | 2/1992 | | |
| JP | H04-6768 B2 | 2/1992 | | |
| JP | 1995318761 A | 12/1995 | ............... | G02B 6/38 |
| JP | H11-287929 | 10/1999 | | |
| JP | 2000-505208 A | 4/2000 | | |
| JP | 2006-323034 A | 11/2006 | | |
| WO | 199734179 A1 | 9/1997 | | |
| WO | WO97/34179 | 9/1997 | ............... | G02B 6/38 |
| WO | WO99/05552 | 2/1999 | ............... | G02B 6/36 |
| WO | WO9905552 | 2/1999 | | |
| WO | 2001011409 | 2/2001 | | |
| WO | WO02/088810 A1 | 11/2002 | ............... | G02B 6/36 |
| WO | 2003076993 | 9/2003 | | |
| WO | 2008121731 A1 | 10/2008 | | |
| WO | 2011/116167 A1 | 9/2011 | | |

OTHER PUBLICATIONS

Patent Cooperation Treaty, International Search Report, Nov. 30, 2011, 7 pages.
Chinese Search Report, issued in corresponding application No. 201180037625X, dated May 5, 2015.
Official Action issued in corresponding JP Application No. 2013-521872, dated Mar. 2, 2015.
Official Action issued in corresponding KR Application No. 20-2013-7000008, dated Oct. 5, 2015.
161 Communication issued in corresponding EP Application No. 11741044.9, dated Mar. 28, 2013.
Jun. 25, 2014 Chinese Search Report issued in counterpart Chinese Application No. 201180037625X.
International Preliminary Report on Patentability for PCT/US2011/045138, dated Feb. 5, 2013.
CN Search Report, Application No. 2011800376531, dated Apr. 20, 2015, 2 pages.
CN Search Report, issued in corresp. application No. 2011800376531, dated Aug. 18, 2014.
EP Examination Report for Application No. 11741043.1, dated Oct. 19, 2015, 14 pages.
JP Office Action, issued in corresp. application No. 2013-521865, dated Apr. 22, 2015.
KR Office Action for Application No. 20-2013-7000007, dated Apr. 18, 2016, 3 pages.
KR Office Action for Application No. 20-2013-7000008, dated Apr. 18, 2016, 3 pages.
KR Official Notice for Filing Response for Application No. 20-2013-7000007, dated Oct. 5, 2015, 3 pages.
Chanclou et al; "Design and Demonstration of a Multicore Single-Mode Fiber Coupled Lens Device"; Optics Communications, 233 (2004) 333-339.
CN201180037625X Search Report dated May 5, 2015.
Cusworth et al; "Angular Tilt Misalignment Loss At A Grin Rod Lens Coupler"; Applied Optics, vol. 25, No. 11, Jun. 1, 1986 p. 1775-1779.
Emkey et al; "Analysis and Evaluation of Graded-Index Fiber-Lenses"; Journal of Lightwave Technology, vol. LT-5, No. 9, Sep. 1987.
Gilsdorf et al; "Single-Mode Fiber Coupling Efficiency With Graded-Index Rod Lenses"; Applied Optics; vol. 33, No. 16, Jun. 1, 1994 p. 3440-3445.
Gradient-Index Lenses Equations Melles Griot Webpage.
Palais; "Fiber Coupling Using Graded-Index Rod Lenses"; Applied Optics; vol. 19, No. 12; Jun. 15, 1980 pp. 2011-2018.
Senior et al; "Misalignment Losses At Multimode Graded-Index Fiber Splices and Grin Rod Lens Couplers"; Applied Optics, vol. 24, No. 7, Apr. 1, 1985, pp. 977-983.
EP11741044.9 Office Action dated Jun. 12, 2018, European Patent Office, 6 pgs.

* cited by examiner

FIBER OPTIC CONNECTORS INCLUDING FERRULES WITH COMPLEMENTARY MATING GEOMETRY AND RELATED FIBER OPTIC CONNECTORS

PRIORITY

This application is a continuation of International Application No. PCT/US11/045176 filed Jul. 25, 2011, which claims the benefit of priority to U.S. Provisional Application Ser. No. 61/369,385 filed on Jul. 30, 2010, both applications being incorporated herein by reference.

BACKGROUND

The disclosure is directed to optical fiber ferrules and related fiber optic connectors. More specifically, the disclosure is directed to optical fiber ferrules with complimentary mating geometry and fiber optic connectors using the same.

Optical fiber is increasingly being used for a variety of applications, including but not limited to broadband voice, video, and data transmission. As consumer devices are steadily using more bandwidth, connectors for these devices will likely move away from electrical connectors and toward using optical connections for increased bandwidth. Generally speaking, conventional fiber optic connectors used for telecommunication networks and the like are not suitable for consumer devices. For instance, conventional fiber optic connectors are relatively large compared with the consumer devices and their interfaces. Additionally, conventional fiber optic connectors are deployed with great care into relatively clean environments and/or cleaned by the craft before connecting the same. Further, even though fiber optic connectors are reconfigurable (i.e., suitable for mating/unmating) they are not intended for a relatively large number of mating cycles. Instead, conventional fiber optic connectors are high precision connectors designed for reducing insertion loss between mating connectors in the optical network.

On the other hand, the consumer electronic devices are expected to have a relatively large number of mating/unmating cycles during ordinary operation. The consumer electronic devices will be operated in a multitude of environments where dirt, dust, and other debris is encountered on a regular basis. Further, consumer electronic devices typically have size and space constraints for making connections. Consequently, there is an unresolved need for fiber optic connectors suitable for consumer devices.

SUMMARY

The disclosure is directed to optical fiber ferrules and related fiber optic connectors and cable assemblies along with methods for making the same. More specifically, the disclosure is directed to optical fiber ferrules and related fiber optic connectors and cable assemblies having features that are suitable for optical connectivity where relatively large numbers of mating/unmating cycles are encountered. One disclosed embodiment is directed to a first fiber optic ferrule having a body with a plurality of optical pathways and a mating geometry having at least one slot monolithically formed in the body. The slot of the ferrule permits a relatively high number of mating/unmating cycles without generating excessive wear and debris, thereby making it suitable for consumer electronic devices or the like. The disclosure is also directed to fiber optic connectors and cable assemblies using the first ferrule.

Another embodiment is directed to a second ferrule having a complimentary mating geometry for the first ferrule. The second fiber optic ferrule includes a body having a plurality of optical pathways and a mating geometry that has at least one guide pin that is monolithically formed in the body and at least one spring retention feature disposed on a rear portion of the ferrule. The second ferrule reduces the number of parts required for a fiber optic connector and allows quick and easy assembly. The disclosure is also directed to fiber optic connectors and cable assemblies using the ferrule.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The ferrules, connectors and/or cable assemblies described herein are suitable for making optical and/or electrical connections for a variety of devices along with methods of making the same. The concepts of the disclosure advantageously allow the simple, quick, and economical connection and disconnection of fiber optic ferrules for relatively large number of mating cycles. Reference will now be made in detail to the preferred embodiments, examples of which are illustrated in the accompanying drawings. Whenever possible, like reference numbers will be used to refer to like components or parts.

Figure 1:
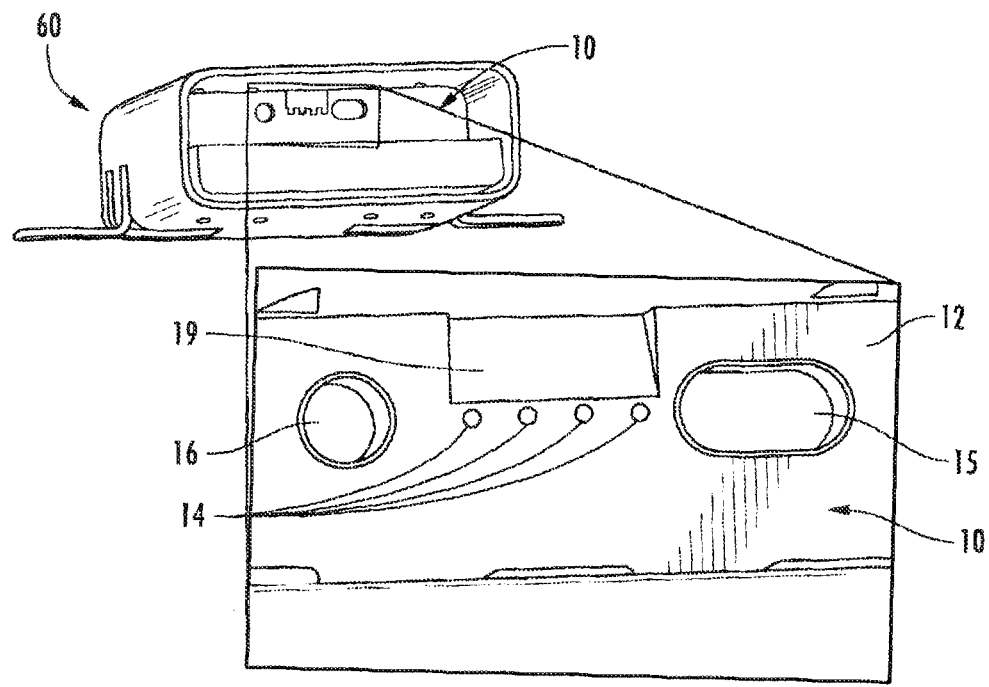
FIG. 1 is perspective end view of a connector having a close-up view of a first fiber optic ferrule with complimentary mating geometry for mating with the fiber optic ferrule shown in FIGS. 2 and 3.
Figure 2:
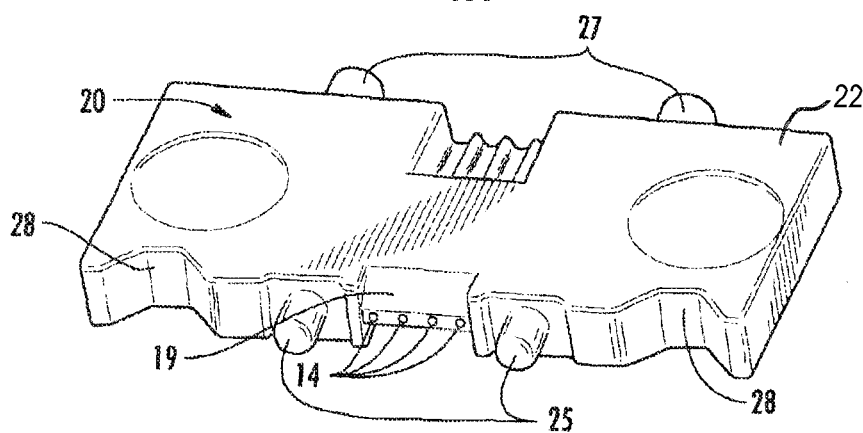
FIGS. 2 and 3 respectively are front and rear perspective views of a second fiber optic ferrule having mating geometry suitable for mating with the first ferrule of FIG. 1.
Figure 3:
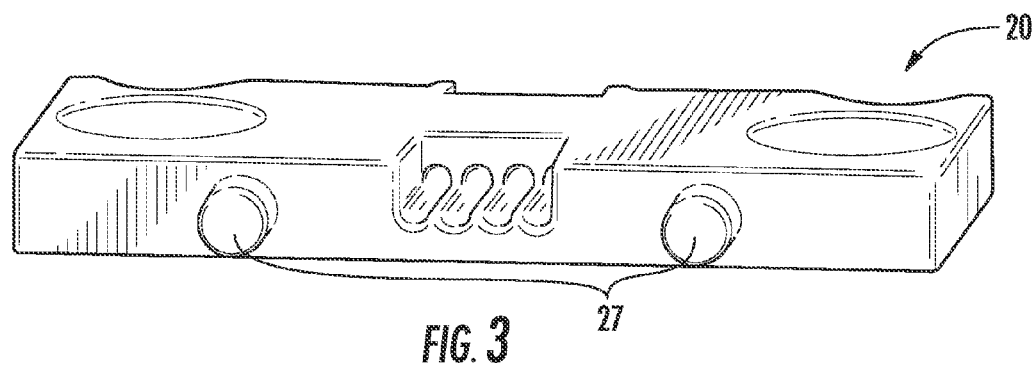

FIGS. 1-3 depict a first fiber optic ferrule 10 and a second fiber optic ferrule 20 having complementary mating geometry for use in suitable complementary structures for making fiber optic connections. Specifically, FIG. 1 is a perspective view of a first fiber optic ferrule 10 (hereinafter ferrule) that is a portion of a connector 60 and FIGS. 2 and 3 are perspective views of a second ferrule 20. Specifically, FIG. 1 is a perspective end view of a connector 60 having a close-up end view of first ferrule 10 which includes mating geometry on a front end for interfacing and making an optical connection with second ferrule 20. As shown, first ferrule 10 includes a body 12 having a plurality of optical pathways 14. As used herein, "optical pathways" mean any suitable structure or component of the ferrule for permitting the transmission of optical signals. By way of example, optical pathway(s) may include optical fiber bores for receiving respective optical waveguides such as optical fibers therein, an optical lens, an active device such as a vertical-cavity surface-emitting laser (VCSEL), a photodiode, other active device, or other structure or component of, or attached to, the ferrule for transmitting optical signals.

The mating geometry of first ferrule 10 includes a slot 15 for receiving a guide pin 25 of second ferrule 20 when the ferrules are mated together. In this embodiment, the mating geometry of first ferrule 10 also includes a second female portion such as a hole 16 that cooperates with slot 15 when mating with a complimentary ferrule. In other words, slot 15 and hole 16 each receive a respective guide pin of the second ferrule. Slot 15 and hole 16 are sized and spaced for cooperating with the guide pins 25 of second ferrule 20. As used herein, slot means that the mating geometry is sufficiently oversized with respect to its complimentary mating geometry in the direction that passes through both centerlines of the mating geometry (i.e., the X-axis), thereby allowing a larger alignment tolerance between the slot and its corresponding mating geometry such as the pin. Ferrules with mating geometry that includes one or more slots allows for a large number of mating cycles since it does not generate a high level of debris with a relatively large number of mating cycles like conventional ferrules having tight-tolerance bore and guide pin mating geometry for creating an interference fit. Additionally, slot 15 allows for a larger tolerance between the complimentary mating geometry such as guide pins of a mating ferrule. In other words, the tolerance of the mating geometry of the second ferrule may have a larger variance while still providing suitable alignment and optical performance.

Figure 1A:
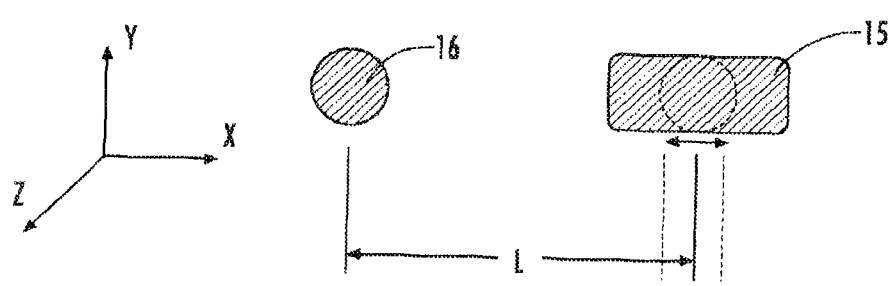
FIG. 1a is a schematic representation of the cooperation of the mating geometry of the ferrule of FIG. 1 and the ferrule of FIG. 2.

Illustratively, FIG. 1a is a schematic representation of the mating geometry between first ferrule 10 and second ferrule 20. Specifically, the mating geometry of first ferrule 10 is represented by the shaded area and the mating geometry of second ferrule 20 is represented by the dashed lines. Although the mating geometry is schematically depicted as round shape or a slot shape with rounded ends any suitable shape(s) may be used for the mating geometry (i.e., slot, holes, and/or pins) such as square, rectangular, hexagonal etc. As shown, the left-side of the mating geometry between the first ferrule 10 and the second ferrule 20 have a relatively snug fit using the same shape, thereby creating an alignment reference datum. On the other hand, the right-side of the mating geometry between the first ferrule 10 and the second ferrule 20 do not have the same shape. In other words, the slot 15 of the first ferrule 10 is larger than the mating feature (e.g. the guide pin) of second ferrule 20, and thus provides a tolerance about a centerline distance L between the left-side and right-side mating geometry as shown. Additionally, the mating geometry may include a chamfer or the like at the edges to aid in alignment and/or reduce wear and debris with repeated matings.

FIGS. 2 and 3 depict second ferrule 20 that is suitable for mating with first ferrule 10. Second ferrule 20 includes a body 22 with a plurality of optical pathways 14 in this case optical fiber bores for receiving optical waveguides such as optical fibers therein. Second ferrule 20 includes mating geometry having at least one guide pin 25 sized and configured for being received by the mating geometry of first ferrule 10, thereby aligning the optical waveguides of mating ferrules. As shown, guide pins 25 are monolithically formed with the body 22 of the second ferrule 20. In other words, guide pins 25 are made from the same material and integral with body 22 of ferrule 20. In the embodiment shown, second ferrule 20 has two guide pins 25 that are monolithically formed in the body of the second ferrule 20 on opposite sides of the plurality of optical pathways 14. Unlike conventional fiber optic ferrules that use precision-machined guide pins that are received into guide pin bores of the ferrule and held in place with a pin retainer, the guide pins 25 of second ferrule 20 are molded into body 22, machined, or otherwise monolithically formed with the body of the first ferrule. Further, guide pins 25 of ferrule 20 protrude a sufficient distance to engage the mating geometry ferrule 10, thereby aligning the optical waveguides mounted within the respective optical pathways 14 (e.g. bores) of the mated ferrules 10,20. However, first ferrule 10 may be mated with a complimentary ferrule using a conventional type ferrule where one or more conventional guide pins that are received in guide pin bores of the ferrule.

The mating geometry of the first and second ferrules 10,20 disclosed herein provides advantageous over conventional mating geometry for a numerous reasons. Conventional mating geometry uses a dedicated guide pin that fits into a guide pin bore of the conventional ferrule and typically results in an interference fit between the guide pins and guide pin bores due to variance in guide pin bore spacing. This interference fit used with conventional ferrules causes wear and debris when subject to a relatively high-number of mating cycles. On the other hand, using a ferrule with at least one slot reduces wear and the debris generated with a large number of mating cycles. Additionally, forming guide pins 25 monolithically with the body 22 of first ferrule 20 provides a reliable and low-cost solution that is suitable for relatively high-mating cycles such as experience with consumer electronic devices. Stated another way, the mating geometry is advantageous since it allows a large number of mating/unmating cycles such as typical with consumer electronic devices. Moreover, the mating geometry of the second ferrule 10 with the slot 26 reduces the wear between the mating geometry of the ferrules compared with the conventional mating geometry.

Second ferrule 20 may optionally include other features. As shown, second ferrule 20 has at least one spring retention feature 27 disposed on a rear portion 21 of the body 22. More specifically, second ferrule 20 has at least two spring retention features 27 disposed on a rear portion 21 of the ferrule and disposed on opposite sides of the plurality of optical fiber bores 14. Although spring retention features 27 are shown as protrusions, other structures are possible for the spring retention feature such as a blind hole, recess, snap-on structure, or the like.

Further, second ferrule 20 may optionally include one or more stops 28. Specifically, second ferrule 20 includes two stops 28 that are recessed from the front surface and disposed on opposite sides of the plurality of optical fiber pathways 14, but the stop(s) may be flush or extend beyond the front surface of the ferrule. Other areas of second ferrule 20 may also have recessed areas. By way of example, second ferrule 20 optionally includes a recessed area (not numbered) about guide pins 25 that are monolithically formed in the body as best shown in FIG. 2. Additionally, the ferrules disclosed herein may also provide electrical connections, thereby providing a hybrid connection.

As shown, first and second ferrules 10,20 also include an optional backdraft portion 19 (i.e., the angled portion) adjacent to the plurality of optical fiber bores. Backdraft portion 19 allows laser processing of the optical fibers that are attached to first and second ferrules 10,20. Specifically, backdraft portion 19 aids manufacturing by providing a relief that inhibits marking and/or damage to the front end of the ferrule. Specifically, the backdraft portion 19 inhibits interaction between a laser beam and/or debris during cutting and/or polishing with the laser beam, thereby inhibiting marking and/or damage to the front end of the ferrule. As shown in FIGS. 1 and 2, the backdraft portions 19 can include a surface that is angled with respect to the longitudinal axis of the ferrules 10,20. Backdraft portion 19 can have any suitable angle and/or geometry such as between 30 to 45 degrees from the front face, but other suitable angles/geometry are possible. Further, the backdraft portion 19 can start at any suitable distance from optical pathways 14 so long as dimensions and structural integrity of the ferrule are preserved. In other variations, the backdraft portion 19 can also be optionally recessed rearward from the front surface of the ferrule having the optical pathways 14. By way of example, a shoulder can be formed adjacent to the backdraft, thereby permitting the backdraft portion 19 to be recessed rearward from the front surface of the ferrules. For instance, the shoulder can have a depth of about 2 microns or greater from the front surface of the ferrule.

Since ferrules 10,20 include backdraft portion 19 processing the plurality of optical fibers attached thereto may include cutting and/or polishing the plurality of optical fibers 40 with a laser beam in one or more steps. For instance, separate steps may be used for cutting and polishing optical fibers with the laser, but cutting and polishing may also occur in one step with the laser. Any suitable type of laser and/or mode of operation for the laser are possible. By way of example, the laser may be a $CO_2$ laser operating in the pulse, continuous, or other suitable mode. The angle between the laser beam and optical fibers may also be adjusted to produce the desired angle on the ends of optical fibers such as 12 degrees, 8 degrees, or flat. Due to the distance between the end face of the ferrule having the bores therein and the outboard front surfaces (not numbered), the laser beam can substantially avoid interaction with the ferrules 10,20 during cutting and polishing of the plurality of optical fibers. Optional backdraft portion 19 is provided to further reduce the probability of interaction between refracted portions of the laser beam/debris and the ferrules. For instance, the laser beam is aligned to cut and/or polish the plurality of optical fibers in a general direction from the bottom of the ferrule 10,20 toward the backdraft portion 19.

By way of example, suitable complementary structures that use first and second ferrules 10,20 include connectors configured as a plug 60 and receptacle 70 that allow the user to make a quick and reliable optical and/or hybrid connection (i.e., optical/electrical) therebetween. More specifically, first ferrule 10 and second ferrule 20 form portions of respective USB connector types that may optionally include a plurality of electrical contacts as shown or that alternatively may form a portion of optical USB connectors. In other words, the plug 60 is configured as a USB plug connector and receptacle 70 is configured as a USB receptacle connector as shown. Other details of first and second ferrules 10 and 20 will be discuss below in combination with the fiber optic plug 60 and receptacle 70 shown in FIGS. 6-10. The concepts of first and second ferrules are useful with other types of ferrule, connectors, and mating devices.

Figure 4:
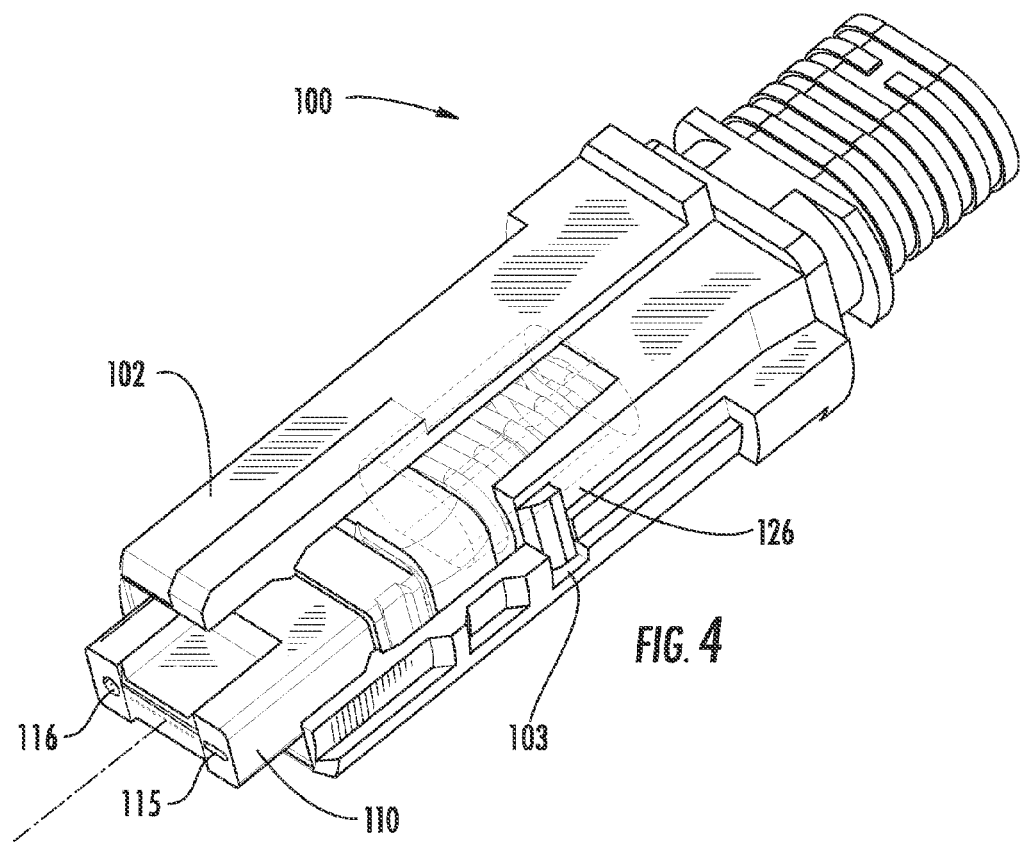
FIGS. 4 and 5 respectively are exploded and perspective views of mating fiber optic connectors using another style of complimentary mating fiber optic ferrules with mating geometry similar to the fiber optic ferrules shown in FIGS. 1-3.
Figure 5:
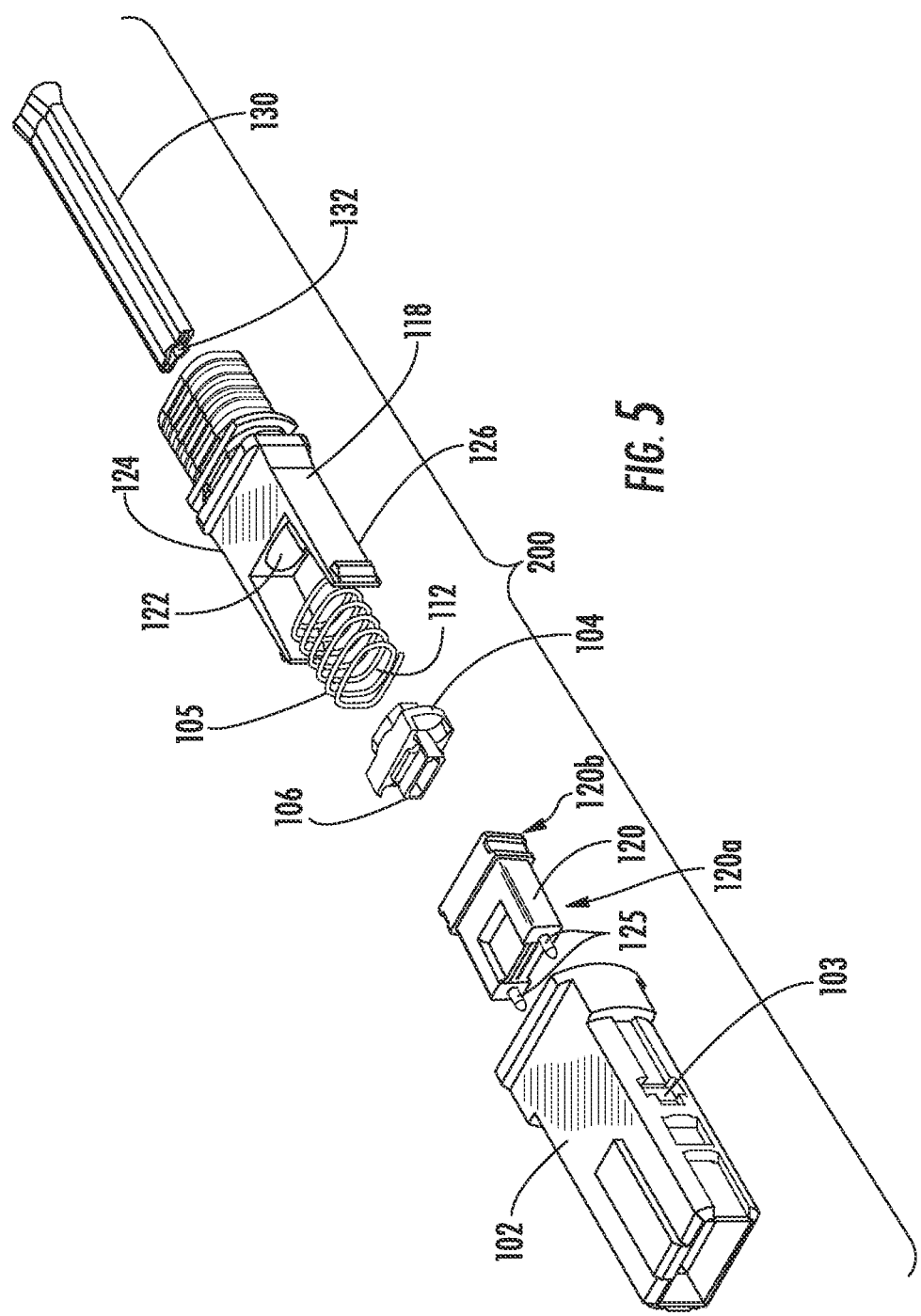

By way of example, FIGS. 4 and 5 respectively are exploded and perspective views of respective fiber optic connectors 100,200 using another set of first and second ferrules 110,120 having complimentary mating geometry. First ferrule 110 includes mating geometry having at least one slot 115, 116 formed in a body 112 similar to ferrule 10 as part of the mating geometry. Likewise, second ferrule 120 includes mating geometry having at least one guide pin 125 monolithically formed with the body similar to ferrule 20 as part of the mating geometry. Mating first and second ferrules 110,120 are configured as a MPO type fiber optic connector such as a MT fiber optic connector that mate together using an adapter (not shown), but other fiber optic connector configurations are possible using the concepts disclosed. Further, fiber optic connectors 100 and 200 are part of a cable assembly having one or more optical waveguides such as optical fibers (not shown for clarity) inserted into the bores of ferrules. The fiber optic connectors 100, 200 are just examples of fiber optic connectors and cable assemblies that can incorporate ferrules in accordance with the disclosed concepts.

More specifically, FIG. 4 illustrates an exploded view of fiber optic connector 100 while FIG. 5 illustrates an assembled view of fiber optic connector 200 that may include like parts represented by identical reference numbers. As illustrated in FIG. 4, the optic connector 100 may optionally comprise a spring seat 104, a coil spring 105, a spring push 118, a lead-in tube 130 and a generally hollow connector housing 102. The optional spring seat 104 of the example embodiment shown in FIG. 4, can be positioned adjacent the rear face of the rear end 110b between the ferrule 110 and the coil spring 105. An opening 106 extending lengthwise through the spring seat 104 can be configured to permit the lead-in tube 130 and the end portions of the optical waveguides (not shown) to pass through the spring push 118 to the rear face of ferrule 110. The lead-in tube 130 can be positioned within an opening 122 of the spring push 118, an opening 112 of the coil spring 110 and the opening 106 of the spring seat 104. An opening 132 extending lengthwise through the lead-in tube 130 receives and guides the end portions of the optical fibers of the fiber optic cable in respective bores of the respective ferrule.

The fiber optic connector 100 can include alignment and/or attachment structure for mating and securing the same within an adapter (not numbered). As shown, the ferrule 110, the spring seat 104, the coil spring 105, a forward portion 124 of the spring push 118 and the lead-in tube 130 can be positioned at least partially within the connector housing 102. In one example, flexible arms 126 provided on spring push 118 can extend lengthwise from the forward portion 124 to engage openings 103 formed in the connector housing 102 for securing the spring push 122 with the connector housing 102. A forward mechanical stop (not visible) can be provided on the interior surface of the connector housing 102 so that the ferrule 110 is movable when the disposed within the connector housing 102, but retained therein. The ferrule 110 is biased in the forward direction by the coil spring 105 and the spring seat 104. Fiber optic connector 200 of FIG. 5 has a similar construction to fiber optic connector 100, but includes ferrule 120 instead of ferrule 110, thereby providing a cable assembly suitable for mating with fiber optic connector 100.

Figure 6:
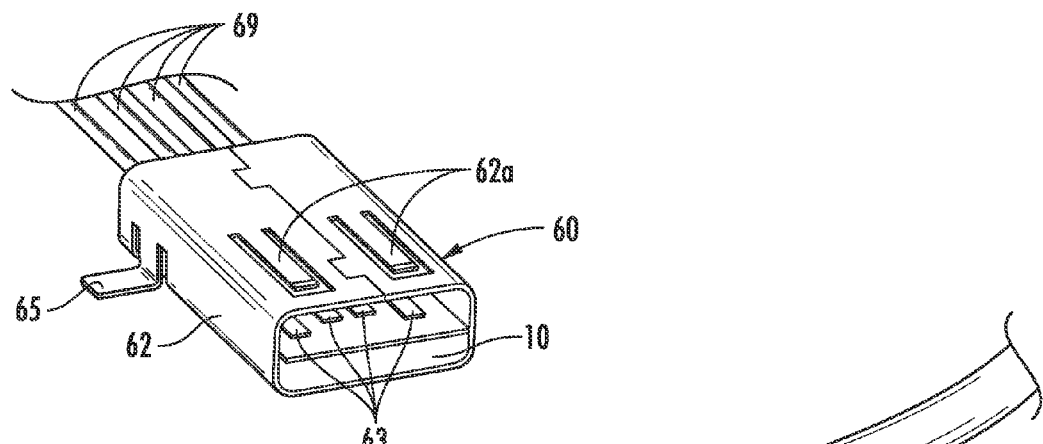
FIGS. 6 and 7 respectively depict explanatory receptacle and a plug connectors that respectively use the first and second fiber optic ferrules depicted in FIGS. 1-3 and form a portion of a cable assembly.
Figure 7:
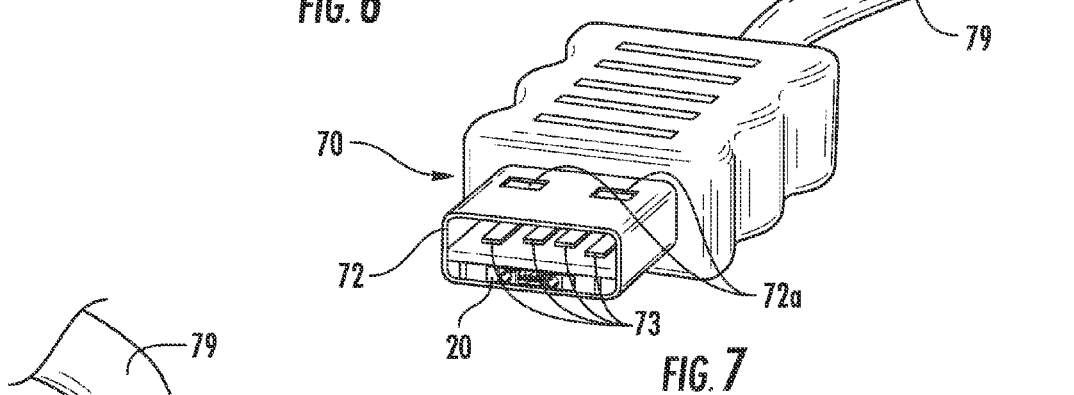
Figure 8:
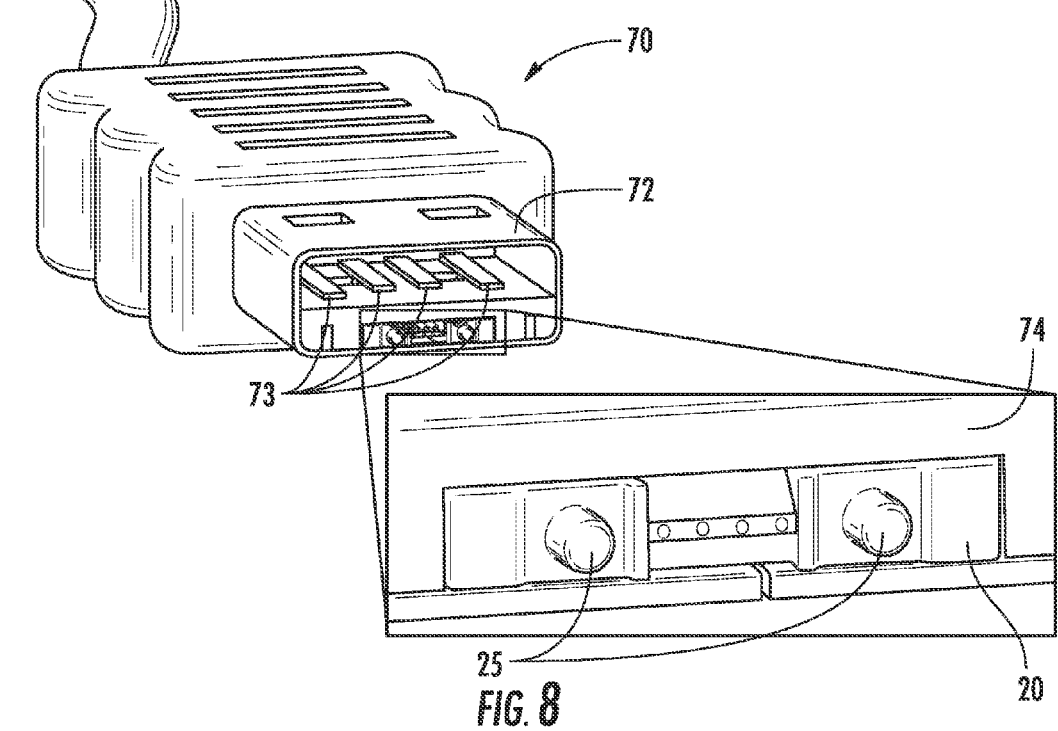
FIG. 8 is a perspective view of the plug connector of FIG. 7 along with a close-up view showing the details of the plug connector.
Figure 9:
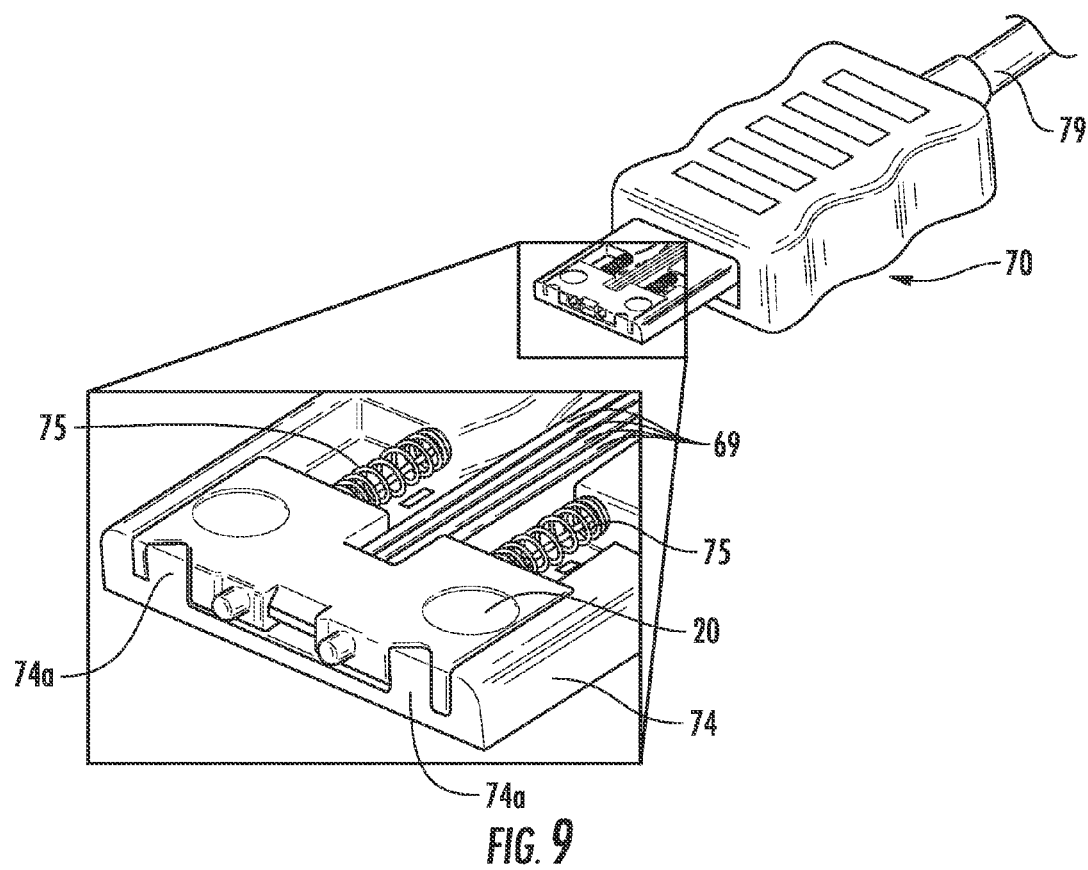
FIG. 9 is a bottom perspective view of the plug connector of FIGS. 7 and 8 with the shroud removed along with a close-up view showing details of the plug connector.
Figure 10:
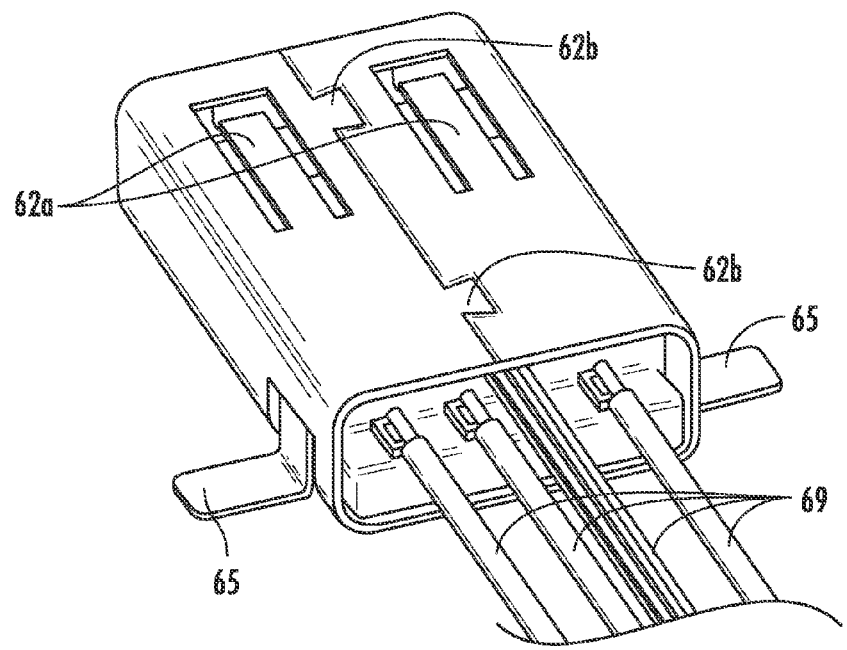
FIG. 10 is a rear perspective view of the receptacle of FIG. 6 showing the electrical connections.

FIGS. 6-10 respectively depict explanatory fiber optic connectors that respectively use the first and second fiber optic ferrules 10,20 depicted in FIGS. 1-3. Specifically, FIGS. 6 and 10 depict a receptacle 60 and FIGS. 7-9 depict a plug 70 that are attached to respective cables, thereby forming a portion of respective cable assemblies (not numbered). Receptacle 60 and plug 70 mate directly together in one orientation to form optical and/or electrical connections therebetween. Although, ferrules 10,20 are depicted as portions of receptacle 60 and plug 70, the ferrules or variations thereof may be used with other types of connectors such as connectors that are solely optical.

Receptacle 60 includes first ferrule 10 at least partially disposed within a shell 62 as shown in FIGS. 6 and 10. Receptacle 60 is configured as USB connector. Specifically, receptacle 60 is backward compatible with USB plugs that only have electrical connections and may be used with suitable USB plugs that have optical connections or both optical and electrical connections. Specifically, receptacle 60 also includes a plurality of electrical contacts 63 for making electrical connection between the receptacle 60 and plug 70. Electrical contacts 63 may be molded with ferrule 10 so that they are slightly protruding or relatively flush with a wiping surface of the ferrule (i.e., the horizontal surface of the ferrule that includes the electrical contacts) or have other suitable attachment means. Receptacle 60 has transmission elements 69 (i.e., both electrical wire and optical fibers) that are routed to the rear of the connector for making electrical connection with the electrical contacts 63 or routed to the plurality of optical pathways 14 of ferrule 10 as best shown in FIG. 10. Shell 62 also includes tabs 65 for securing and/or grounding receptacle 60 to a circuit board or the like. As best shown in FIG. 10, shell 62 includes a plurality of latching arms 62a for securing the plug with the receptacle 60 when mated together. Although, not visible a second set of latching arms 62a is disposed on both the lower surface of shell 62. As shown, latching arms 62a are cantilevered, but can have other suitable constructions or be omitted altogether. Further, shell 62 includes locking tabs 62b for securing the seam of shell 62 as best shown in FIG. 10.

FIGS. 7-9 depict a connector configured as plug 70 suitable for mating with receptacle 60. Plug 70 includes second ferrule 20 at least partially disposed within a shell 72. FIG. 8 is a perspective view of the plug 70 with a close-up view showing the ferrule 20 within ferrule holder 74, and FIG. 9 is a bottom perspective view of plug 70 with the shell 72 removed to show the ferrule 20 cooperation within ferrule holder 74.

Explanatory plug 70 includes ferrule 20, shell 72, electrical contacts 73, a ferrule guide 74, a pair of resilient members 75 for biasing ferrule 20 forward, and an outer housing (not numbered). Like receptacle 60, plug 70 is configured as USB connector, but other types of connectors are possible with the concepts disclosed herein. Specifically, plug 70 is backward compatible with USB receptacles that only have electrical connections and may be used with suitable USB receptacles that have optical connections or both optical and electrical connections. Specifically, plug 70 includes a plurality of electrical contacts 73 for making electrical connection between the receptacle 60 and plug 70 (i.e., connection with electrical contacts 63 of the receptacle 60). As with receptacle 60, electrical contacts 73 may be molded with ferrule 20 so that they are relatively flush with a wiping surface of the ferrule (i.e., the horizontal surface of the ferrule that includes the electrical contacts) or have other suitable attachment means. Plug 70 has transmission elements 69 (i.e., both electrical wire and optical waveguides) that are routed to the rear of the connector for making electrical connection with the electrical contacts 73 or routed to the plurality of bores 14 of ferrule 20 as shown.

The close-up view of FIG. 9 depicts ferrule 20 disposed within a pocket (not numbered) of ferrule guide 74 and biased to a forward position by one or more resilient members 75. As shown, the pocket of ferrule guide 74 has a channel that leads to the rear to provide a passageway for routing optical waveguides (i.e., transmission elements) of cable 79 to ferrule 20. In this embodiment, resilient members 75 are coil springs, but other suitable resilient members such as leaf springs or the like are possible. As best shown in FIG. 2, ferrule 20 includes spring retention features 27 on opposite sides of the plurality of bores 14. As depicted, spring retention features 27 are protrusions that seat resilient members 75 to the rear end of ferrule 20. Additionally, ferrule guide 74 includes protrusions or the like for seating the second end of resilient members 75 as shown. Ferrule guide 74 also includes ferrule stops 74a for limiting the travel of ferrule 20 within the ferrule guide. Ferrule stops 74a have a shape and position that is complimentary to stops 28 on ferrule 20 (FIG. 2). Additionally, ferrule stops 74a and stops 28 have complimentary angled surfaces to help center the ferrule 20 with the ferrule guide 74 and inhibit undue sideways displacement. When shell 72 is installed, ferrule 20 is trapped between the ferrule guide 74 and shell 72 as shown in FIGS. 7 and 8. Shell 72 also includes a plurality of windows 72a for cooperating with latching arms 62a of receptacle 60 for securing the plug 70 to receptacle 60 when mated. Further, the opposite side of ferrule guide 74 is used for mounting electrical contacts 73 thereto as depicted.

Figure 11:
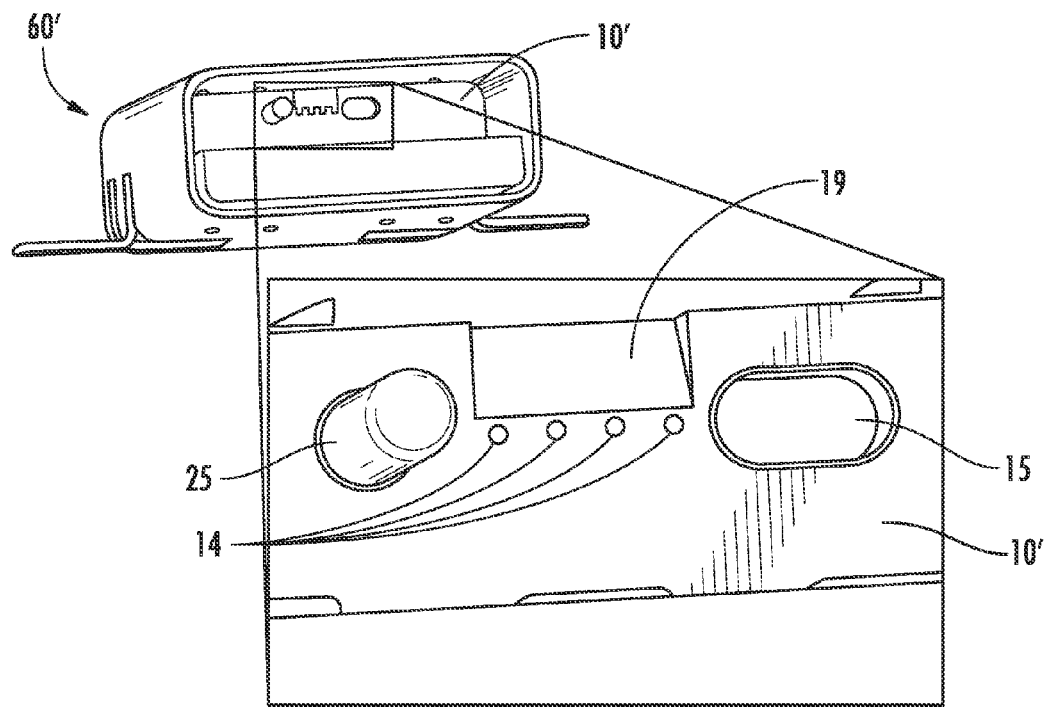
FIG. 11 is a perspective end view of another fiber optic ferrule having both female and male mating geometry according to the concepts disclosed herein.
Figure 12:
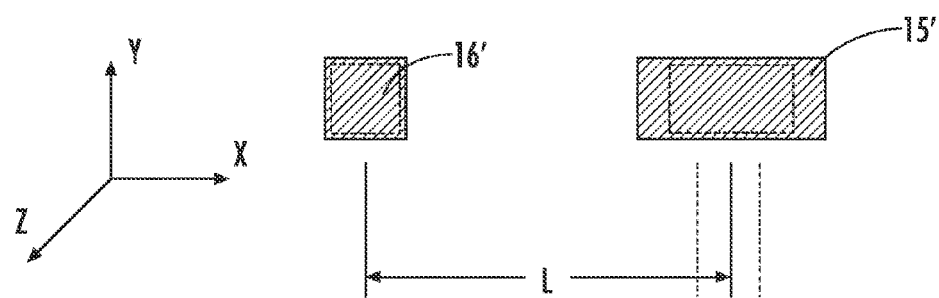
FIG. 12 is a schematic representation showing the different shapes for the mating geometry.

Additionally, the first ferrule can have other mating geometry while still using the slot as disclosed herein. By way of example, FIG. 11 depicts a connector 60' having a ferrule 10'. Ferrule 10' is similar to first ferrule 10' but includes mating geometry with slot 15 and a guide pin 25 disposed on opposite sides of the plurality of optical fiber bores 14. In other words, ferrule 10' has a female portion and a male portion; instead of two female portions like ferrule 10. Of course, the concept of using a female slot portion and a male pin on the same ferrule may be used with any suitable ferrule and/or connector design. Moreover, as stated above, the mating geometry can have shapes other than round. Illustratively, FIG. 12 is a schematic representation showing non-round complimentary mating geometry with a slot 15' and a rectangular shaped hole 16' for the first ferrule. The second ferrule has complimentary mating geometry configured as rectangular guide pins sized and shaped for mating with slot 15' and hole 16'. Using mating geometry with flat surfaces may reduce forces between the mating geometry. In other words, the force is spread over a larger surface with the flat surfaces (i.e., squares and rectangles) compared with the line contact created by round geometry, thus the flat surfaces may reduce wear and debris. Moreover, the flat surfaces can increase the stability along the weak axis between the ferrules. Stated another way, the stability is improved since a greater volume of material must be deformed with the flat surface before inducing an angle between the ferrules along the weak axis (i.e., bending about the centerline of the pin).

Also disclosed is a method of making a fiber optic ferrule having a body with a plurality of optical pathways and a mating geometry as discussed herein. The method includes the steps of forming the body of the ferrule so that the mating geometry has at least one guide pin monolithically formed in the body of the fiber optic ferrule and at least one spring retention feature disposed on a rear portion of the ferrule. The method can further include forming at least two spring retention features on a rear portion of the ferrule such as disposed on opposite sides of the optical pathways. The spring retention feature may be a protrusion or a bore. Other optionally steps may include forming recessed backstop or a backdraft portion on the ferrule. As discussed, the method may include the further steps of creating a connector and/or a cable assembly using the ferrule.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A fiber optic ferrule, comprising:
   a body having:
      a plurality of optical pathways;
      a mating geometry, wherein the mating geometry has at least one guide pin that is monolithically formed in the body of the fiber optic ferrule;
      at least two spring retention features disposed on a rear portion of the ferrule and disposed on opposite sides of the plurality of optical pathways; and
      a backdraft portion adjacent to the plurality of optical pathways allowing laser processing of a plurality of optical waveguides attached to the ferrule.

2. The ferrule of claim 1, wherein the at least two spring retention features are protrusions or bores.

3. The ferrule of claim 1, further including a recessed area about the at least one guide pin that is monolithically formed in the body of the ferrule.

4. The ferrule of claim 1, wherein the plurality of optical pathways are selected from the group of: optical fiber bores, optical lens, or an active device.

5. The ferrule of claim 1, wherein the ferrule is a portion of a connector.

6. The ferrule of claims 5, wherein the connector is a portion of a cable assembly.

7. The ferrule of claim 1, wherein the ferrule is a portion of a USB connector having a plurality of electrical contacts.

8. The ferrule of claim 1, wherein the ferrule is mated with a complementary fiber optic ferrule.

9. A method of making a fiber optic ferrule having a body with a plurality of optical pathways and a mating geometry including the steps of:
   forming the body of the ferrule with mating geometry that includes at least one guide pin monolithically formed in the body along with at least two spring retention features disposed on a rear portion of the ferrule and disposed on opposite sides of the plurality of optical pathways; and
   forming a backdraft portion adjacent to the plurality of optical pathways.

10. The method of claim 9, further including the step of creating a connector or a cable assembly that includes the ferrule.

11. The method of claim 9, further including the step of laser processing a plurality of optical waveguides attached to the ferrule.

12. The ferrule of claim 1, wherein the backdraft portion comprises a surface that is angled with respect to a longitudinal axis of the ferrule.

13. The ferrule of claim 1, wherein the backdraft portion defines an angle between 30 degrees and 45 degrees with respect to a front face of the body.

* * * * *